United States Patent
Lim et al.

(10) Patent No.: US 8,248,976 B2
(45) Date of Patent: Aug. 21, 2012

(54) POWER CONTROL AND SCHEDULING METHOD IN CONSIDERATION OF INTERFERENCE LEVELS BETWEEN NEIGHBOR SECTORS IN COMMUNICATION SYSTEM

(75) Inventors: Kwang-Jae Lim, Daejeon (KR); Chul-Sik Yoon, Seoul (KR)

(73) Assignees: Samsung Electronics Co., Ltd., Suwon-Si (KR); Electronics and Telecommunications Research Institute, Daejeon (KR)

( * ) Notice: Subject to any disclaimer, the term of this patent is extended or adjusted under 35 U.S.C. 154(b) by 327 days.

(21) Appl. No.: 12/303,346

(22) PCT Filed: Jun. 12, 2007

(86) PCT No.: PCT/KR2007/002830
§ 371 (c)(1),
(2), (4) Date: Dec. 3, 2008

(87) PCT Pub. No.: WO2007/145461
PCT Pub. Date: Dec. 21, 2007

(65) Prior Publication Data
US 2009/0196192 A1    Aug. 6, 2009

(30) Foreign Application Priority Data

Jun. 12, 2006   (KR) .................. 10-2006-0052660
Jun. 20, 2006   (KR) .................. 10-2006-0055514
Apr. 16, 2007   (KR) .................. 10-2007-0036974

(51) Int. Cl.
*H04B 7/00* (2006.01)

(52) U.S. Cl. .............. 370/310; 370/318; 370/329
(58) Field of Classification Search ............. 455/522, 455/67.13, 126, 240.1; 714/760; 370/332, 370/330, 335, 310, 318, 329
See application file for complete search history.

(56) References Cited

U.S. PATENT DOCUMENTS 5,982,760 A * 11/1999 Chen .................. 370/335
6,526,266 B1 * 2/2003 Obara ................. 455/126
(Continued)

FOREIGN PATENT DOCUMENTS
WO    2006/007318 A1    1/2006

OTHER PUBLICATIONS

IEEE 802 LAN/MAN Standards Committee, IEEE P802.20/D2.1 Draft Standard for Local and Metropolitan Area Networks—Standard Air Interface for Mobile Broadband Wireless Access Systems Supporting Vehicular Mobility—Physical and Media Access Control Layer Specification, May 2006, pp. 1-850, New York, New York.

*Primary Examiner* — Anh-Vu H Ly
*Assistant Examiner* — Gbemileke Onamuti
(74) *Attorney, Agent, or Firm* — Jefferson IP Law, LLP

(57) ABSTRACT

In order to perform uplink scheduling for a terminal, a base station receives information on uplink interference due to the terminal from neighbor base stations, transmits the information on the uplink interference to the terminal, receives information on transmission power of a feedback channel from the terminal through the feedback channel, compares the transmission power of the feedback channel and reception power of the feedback channel so as to estimate transmission loss, and performs uplink scheduling for the terminal by reflecting the transmission loss.

10 Claims, 3 Drawing Sheets

U.S. PATENT DOCUMENTS

| | | |
|---|---|---|
| 6,546,058 B1 | 4/2003 | Gilhousen et al. |
| 6,748,201 B2 * | 6/2004 | Black et al. ................ 455/240.1 |
| 2002/0145968 A1 | 10/2002 | Zhang et al. |
| 2003/0054850 A1 | 3/2003 | Masseroni et al. |
| 2005/0107106 A1 * | 5/2005 | Valkealahti et al. .......... 455/522 |
| 2006/0073791 A1 * | 4/2006 | Senarath et al. ........... 455/67.13 |
| 2006/0262754 A1 * | 11/2006 | Andersson et al. ........... 370/332 |
| 2008/0084844 A1 * | 4/2008 | Reznik et al. ................. 370/330 |

* cited by examiner

[Fig. 1]
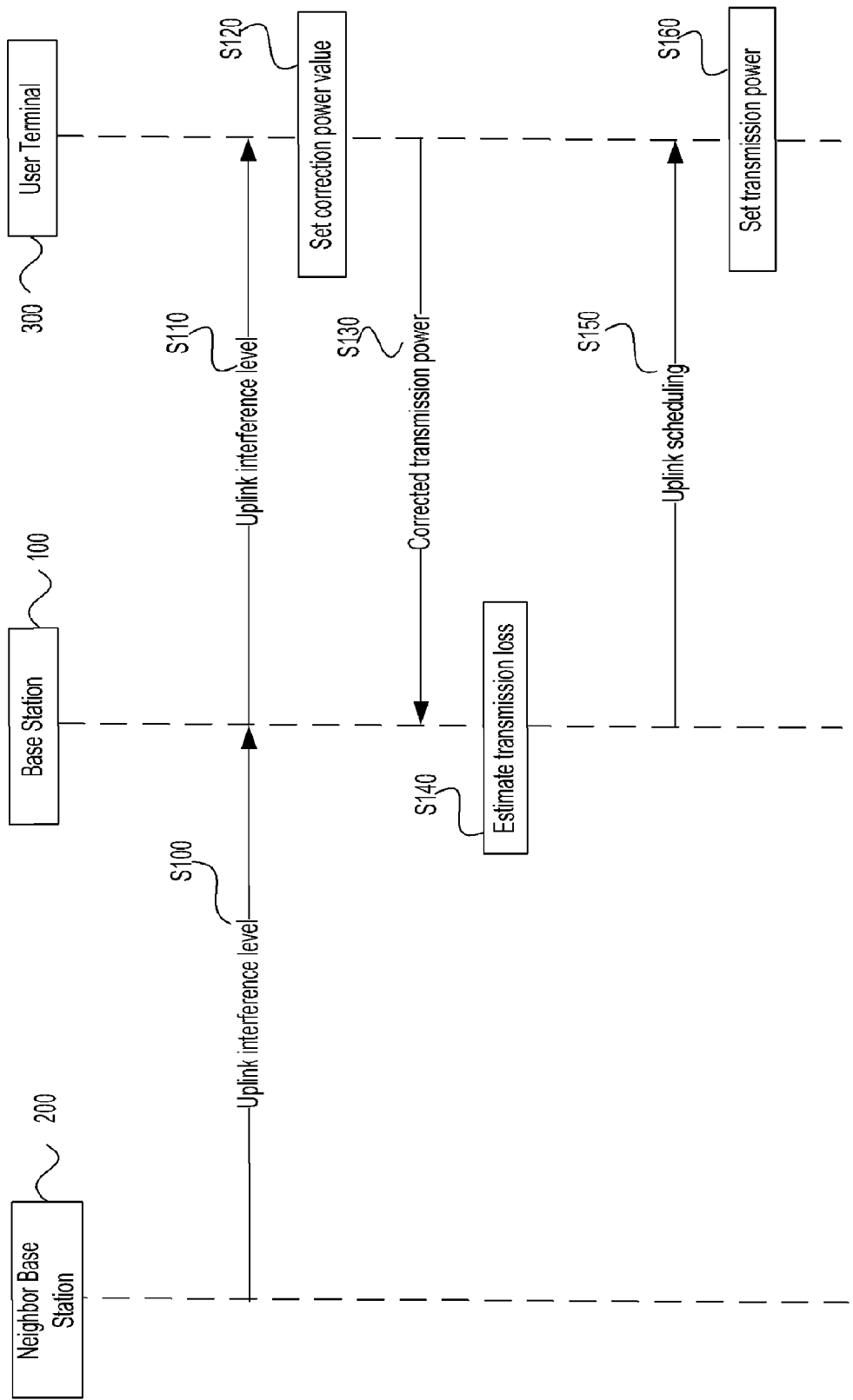

[Fig. 2]
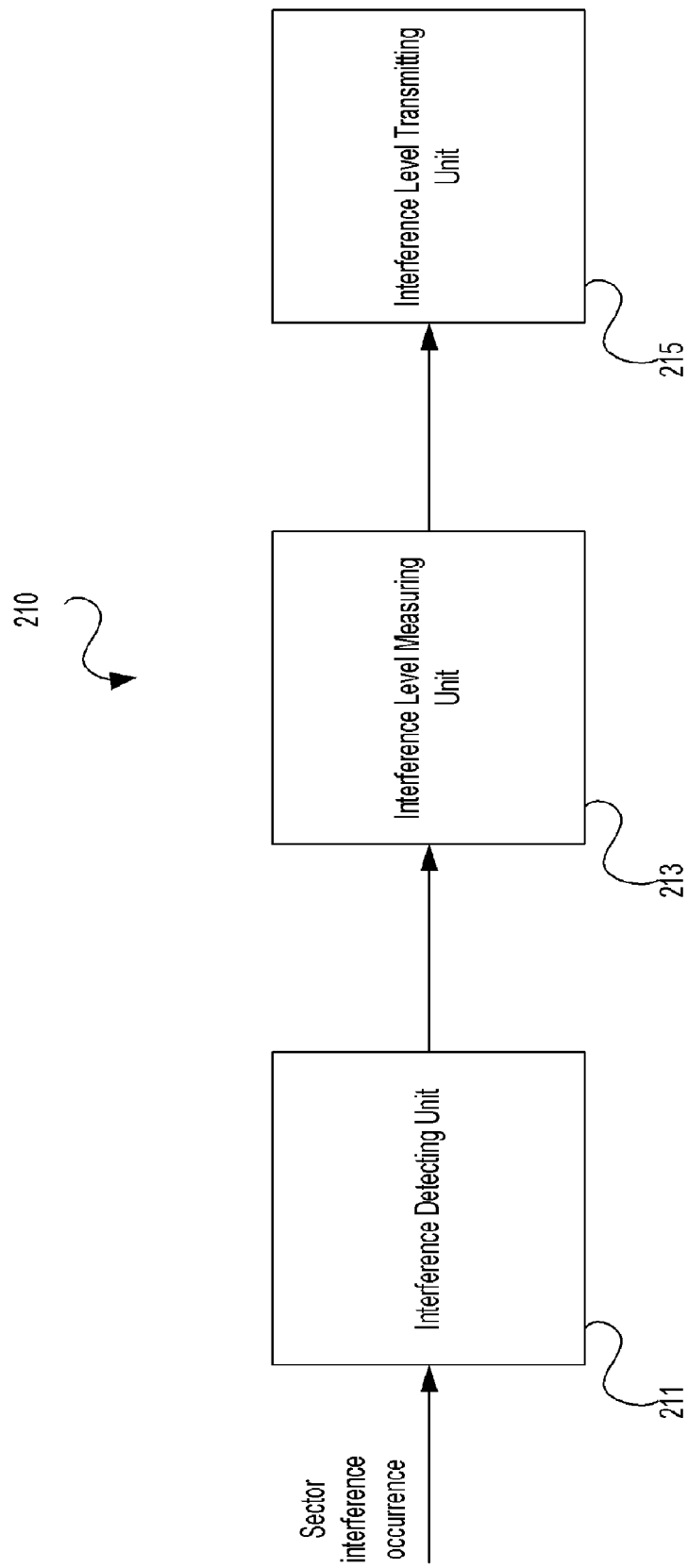

[Fig. 3]
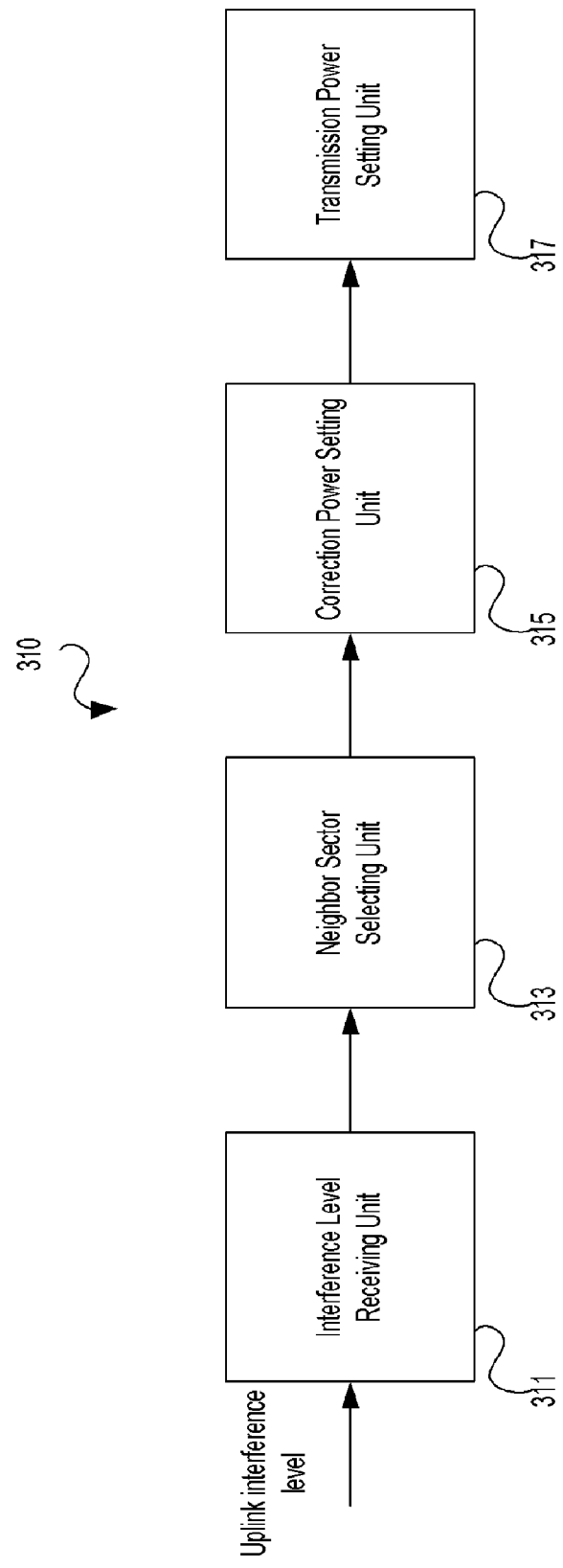

POWER CONTROL AND SCHEDULING METHOD IN CONSIDERATION OF INTERFERENCE LEVELS BETWEEN NEIGHBOR SECTORS IN COMMUNICATION SYSTEM

TECHNICAL FIELD

The present invention relates to a power control and scheduling method in consideration of interference levels between neighboring sectors in a communication system.

BACKGROUND ART

An uplink power control method that considers uplink interference levels received from neighbor sectors is defined in the IEEE 802.16 standard or the like.

The draft standard is based on a power adjusted value of an uplink feedback channel in order to set transmission power for uplink traffic burst transmission. In order to perform additional transmission power control in consideration of interference levels between neighbor sectors, each user terminal uses a distribution method that determines a power adjusted value. In this case, the feedback channel is used for the purpose of a channel quality report, a bandwidth request, a band selection, a report on a beam index for beamforming, and the like during an uplink.

The base station measures a ratio of received signal to interference and noise (SINR) of the feedback channel, and broadcasts a power adjusted value for satisfying a specifically required SINR through a downlink control channel to a user terminal. The user terminal adjusts transmission power for the feedback channel according to the power adjusted value that has been received through a downlink control channel.

In addition, transmission power of a traffic burst that is to be used during an uplink is set by adding a predetermined control-data power offset to the transmission power of the feedback channel.

Further, when the base station informs a user terminal of an uplink traffic burst allocation through the downlink control channel, the base station can set a correction power offset for additional power correction that is to be used during an uplink traffic burst transmission.

That is, the user terminal adds the predetermined control-data power offset and the correction power offset to the transmission power of the feedback channel, and sets power for traffic burst transmission.

In the draft standard, an additional power adjusting method in consideration of interference levels between neighbor sectors is included in the general uplink power control method.

First, the base station measures a level of interference that occurs at the time of an uplink transmission of a user terminal that belongs to a neighbor sector, broadcasts the measured interference level to the user terminal with a predetermined period, and transmits an interference value of another sector composed of 2 bits in all subcarriers belonging to one OFDM symbol such that user terminals belonging to another sector other than a corresponding sector, which the base station is responsible for, can receive an interference value of another sector.

The user terminal receives an interference value of another sector that is broadcasted from base stations of neighbor sectors other than a service sector, to which the user terminal belongs, in order to perform power control in consideration of interference levels of the neighbor sectors. The user terminal calculates a correction power offset on the basis of interference values of another sector for the neighbor sectors, and adds a correction power offset in consideration of a predetermined control-data power offset and interference of the neighbor sectors to transmission power of the feedback channel so as to set the uplink traffic burst transmission power.

If the base station informs the user terminal of a correction power offset set by the base station through a downlink control channel, the user terminal sets the correction power offset received from the base station instead of the correction power offset set by the user terminal as the uplink traffic burst transmission power.

The base station needs to know a transmission power offset used by each user terminal in order to appropriately set a modulation and coding scheme and a bandwidth used by each user terminal for the purpose of uplink traffic burst transmission. For this purpose, the user terminal transmits a power control report message that includes information on a power offset used by the user terminal and a maximum value of the number of subcarriers that can be applied by using transmission power of the user terminal to the base station.

The base station sets a modulation and coding scheme and a power offset necessary for uplink traffic burst transmission of the user terminal by using the power offset of the received power control report message and the maximum value of the number of subcarriers, and informs the user terminal thereof through the downlink control channel.

However, according to the power control method, the base station uses only one OFDM symbol in transmitting interference values of another sector composed of 2 bits such that when the base station broadcasts the received interference levels to the neighbor sector, the user terminals in another sector can also receive them. Therefore, the radio resource may be wasted.

Further, since an interference value of another sector is broadcasted from the base station of the neighbor sector, a range of the user terminal, which is capable of receiving the interference value of another sector, may be restricted.

Furthermore, since each user terminal needs to receive an interference value of another sector that is broadcasted from a neighbor sector, each user terminal needs to periodically receive not only a downlink signal of a sector corresponding to each user terminal but also a downlink signal transmitted from a neighbor sector.

Further, since each user terminal uses a power control report message in order to inform the base station of a correction power offset set by each user terminal, power control is not quickly reported to the base station. The reason is because the user terminal needs to perform various processes, such as an uplink band request, a band allocation through a control channel, or transmission of a power control report message, in order to transmit the power control report message in the uplink.

When the power control report that the base station receives from the user terminal does not exist or is not received for a long time, the base station performs uplink scheduling on the basis of information of a out-of-data power control report. For this reason, it is not possible to accurately perform uplink traffic burst transmission from the user terminal to the base station.

Furthermore, when the base station allocates the uplink traffic burst to the user terminal through the control channel, if it includes a correction power offset set by the base station, the user terminal performs power control by using the included correction power offset. Therefore, the user terminal cannot use a correction power offset that is selected in consideration of an interference situation and a channel situation of a neighbor sector.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a power control and scheduling method in consideration of interference levels between neighbor sectors, having advantages of reducing transmission power and a radio resource used by a base station and improving a receiving function of a user terminal.

Further, the present invention has been made in an effort to provide a power control and scheduling method in consideration of interference levels between neighbor sectors, having advantages of allowing a user terminal to immediately adjust transmission power according to the interference levels between the neighbor sectors and a channel situation.

The present invention has been made in a further effort to provide a power control and scheduling method in consideration of interference levels between neighbor sectors, having advantages of allowing a base station to perform uplink scheduling according to power of a user terminal that is set in consideration of the interference levels between the neighbor sectors.

Technical Solution

An exemplary embodiment of the present invention provides a method in which a first base station performs uplink scheduling for a terminal. The method includes receiving information on uplink interference by the terminal from a second base station that neighbors the first base station, transmitting the information on the uplink interference to the terminal, receiving information on reported transmission power of a feedback channel from the terminal through the feedback channel, comparing the reported transmission power and received power of the feedback channel so as to estimate transmission loss, and performing the uplink scheduling for the terminal by reflecting the transmission loss.

Another embodiment of the present invention provides a method in which a terminal sets transmission power for a serving base station. The method includes receiving uplink interference levels for a plurality of sectors neighboring the serving base station from the serving base station, selecting a neighbor sector that has an uplink interference level whose value is larger than a threshold value among the uplink interference levels, setting a negative correction power offset according to the uplink interference level of the selected neighbor sector, setting correction transmission power by subtracting, from transmission power used in a feedback channel used to report the transmission power, the correction power offset, and transmitting the correction transmission power to the serving base station through the feedback channel.

Yet another embodiment of the present invention provides a method in which a terminal sets transmission power for a serving base station. The method includes receiving uplink interference levels measured in a plurality of sectors neighboring the serving base station from the serving base station, selecting a neighbor sector that has an uplink interference level whose value is smaller than a threshold value among the uplink interference levels, setting a positive correction power offset according to the uplink interference level of the selected neighbor sector, setting correction transmission power by subtracting, from transmission power used by a feedback channel used to report the transmission power, the correction power offset, and transmitting the correction transmission power to the serving base station through the feedback channel.

According to an embodiment of the present invention, there is provided a base station for measuring uplink interference caused by the uplink transmission of terminals which are belonging to other base stations. The base station includes an interference detecting unit that detects uplink interference that the terminals causes at the time of transmitting an uplink traffic burst, an interference level measuring unit that normalizes the uplink interference with an uplink interference level according to a value of the uplink interference, and an interference level transmitting unit that transmits the uplink interference level to the other base stations through a communication network.

BRIEF DESCRIPTION OF THE DRAWINGS

FIG. 1 is a view schematically illustrating a method in which a base station performs scheduling for a user terminal according to an exemplary embodiment of the present invention;

FIG. 2 is a block diagram schematically illustrating an interference measuring unit of a neighboring base station according to an exemplary embodiment of the present invention; and FIG. 3 is a block diagram schematically illustrating an interference level controller of a user terminal according to an exemplary embodiment of the present invention.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. The terms "unit" and "module" used herein means one unit that processes a specific function or operation, and may be implemented by hardware or software and a combination thereof.

A power control and scheduling method in consideration of interference levels between neighbor sectors in a communication system according to an exemplary embodiment of the present invention will now be described in detail with reference to the accompanying drawings.

FIG. 1 is a view schematically illustrating a power control method in an uplink between a base station and a user terminal according to an exemplary embodiment of the present invention.

As shown in FIG. 1, a base station 100 that is responsible for each sector measures an uplink interference level (neighbor sector interference (NSI)), which is an interference level between sectors that user terminals 300 of a neighbor base station 200 cause at the time of uplink traffic burst transmission, and transmits the measured uplink interference level to the base station 100 providing service to the corresponding user terminals 300 through a communication network (Step 100).

Each base station 100 periodically broadcasts the collected uplink interference level of the neighbor sector to the user terminals 300 in the sector of each base station 100 through a downlink broadcasting channel or a control channel (Step S110).

In this case, each base station 100 can broadcast the uplink interference level such that only the user terminals 300 existing in a service region of each base station 300 receive the uplink interference level. Therefore, each base station 100 can broadcast the uplink interference level by using a part of subcarriers of one OFDM symbol. That is, the number of sectors that neighbor one base station 100 is in a range of 3 to 8, and each base station 100 broadcasts three to eight uplink interference levels to the user terminals 300 belonging to each base station 100 by using a part of subcarriers. For example, if a processing gain is transmitted as 8 in order to transmit an uplink interference level composed of 2 bits, 16 subcarriers are used to transmit one uplink interference level, and 128 subcarriers are used to transmit 8 uplink interference levels.

Then, the user terminal 300 that has received the uplink interference levels broadcasted by the base station 100 selects a neighbor sector, of which a value of an uplink interference level is smaller or larger than a standard value, among the received uplink interference levels, and sets a correction power offset according to the uplink interference level of the selected neighbor sector (Step S120). In this case, when a value of the uplink interference level of the neighbor sector is larger than a threshold value, a negative correction power offset is set. In contrast, when the value of the uplink interference level of the neighbor sector is smaller than the threshold value, a positive correction power offset is set.

For example, when the user terminal 300 determines to reduce the transmission power because the interference level of the neighbor sector is high and sets a negative correction power offset, the user terminal 300 reports the transmission power such that the transmission power is larger than an actual transmission power of a feedback channel by a correction power offset. For this reason, the base station 100 compares the received power of the feedback channel and the corrected transmission power having been reported to be larger than the actual transmission power and calculates uplink transmission loss. As a result, the base station 100 calculates the transmission loss to become larger than the actual transmission loss by the correction power offset.

The user terminal 300 corrects the correction power offset on the transmission power, which is used when the feedback channel is transmitted to the base station 100, so as to set the corrected transmission power, and transmits the set corrected transmission power to the base station 100 through the feedback channel (Step S130).

The corrected transmission power $P'_{FBCH}$ that is to be reported through the feedback channel can be determined by Equation 1.

$$P'_{FBCH} = P_{FBCH} - \Delta_{NSI} [dB] \quad \text{(Equation 1)}$$

In this case, $P'_{FBCH}$ denotes corrected transmission power that is to be reported through the feedback channel, and $P_{FBCH}$ denotes transmission power that the user terminal 300 actually uses for the feedback channel. $\Delta_{NSI}$ denotes a correction power offset that is set on the basis of the uplink interference level, which the user terminal 300 receives from the base station 100, and a channel gain with the neighbor sectors.

Then, the base station 100, which has received the corrected transmission power from the user terminal 300 through the feedback channel, estimates the transmission loss through the received power of the feedback channel and the corrected transmission power (Step 140). The base station 100 measures the reception interference and noise power in an uplink traffic region, determines a modulation and coding scheme and a bandwidth used in the uplink traffic burst allocation, and performs uplink scheduling for the user terminal 300 (Step S150).

Then, the base station 100 measures a ratio of interference and noise to the received signal (SINR) of the feedback channel and broadcasts a power adjusted value for satisfying a specifically required SINR through the downlink control channel to the user terminal 300.

Then, the user terminal 300 sets a modulation and coding scheme and a bandwidth that are to be used when transmitting an uplink traffic burst according to uplink scheduling of the base station 100, and sets transmission power, which is to be used when transmitting the uplink traffic burst, through an open-loop or closed-loop power control method.

When the transmission power that is to be used at the time of transmitting the uplink traffic burst is set through the open-loop power control method, transmission power $P_{traffic}$ per subcarrier is set by Equation 2.

$$P_{traffic} = L_{UL} + NI_{traffic} + SINR_{target} + \Delta_{BS} + \Delta_{MS} [dB] \quad \text{(Equation 2)}$$

In this case, $L_{UL}$ denotes uplink transmission loss, $NI_{traffic}$ denotes interference and noise power per subcarrier, $SINR_{target}$ denotes a ratio of interference and noise to a requested received signal per subcarrier for a modulation and coding scheme, $\Delta_{BS}$ denotes an accumulated value of correction values that have been received from the base station 100 until the current time, and $\Delta_{MS}$ denotes an accumulated value of recent power control commands of the base station 100.

Further, $L_{UL}$ denotes a value that is obtained by estimating transmission loss at the time of uplink transmission by the base station 100, and $NI_{traffic}$ denotes a value that is obtained by normalizing received interference and noise power in the uplink traffic region with the number of subcarriers, which is measured by the base station 100. The $NI_{traffic}$ is periodically broadcasted to the user terminal 300 through the downlink broadcasting channel or the control channel. $SINR_{target}$ denotes a ratio of interference and noise to a received signal that is required for each subcarrier for a modulation and coding scheme that is used at the time of traffic burst transmission, and is informed to the user terminal 300 in advance through the downlink broadcasting channel. $\Delta_{BS}$ denotes an accumulated value of correction values that have been received from the base station 100 before the user terminal 300 is instructed for a correction value, when the transmission power set by the user terminal 300 is incorrect and the base station 100 instructs the correction value. $\Delta_{MS}$ denotes an accumulated value of recent power control commands of the base station 100 for the uplink feedback channel.

Then, when the closed-loop power control is used to perform the uplink power control, transmission power $P_{traffic}$ per subcarrier can be determined by Equation 3.

$$P_{traffic} = P_{previous} + (SINR_{target} - SINR_{previous}) + \Delta_{BS} [dB] \quad \text{(Equation 3)}$$

$P_{previous}$ denotes transmission power that is used at the time of transmitting the traffic burst, $SINR_{target}$ denotes a ratio of interference and noise to a received signal that is required for each subcarrier for a modulation and coding scheme, $SINR_{previous}$ denotes a ratio of interference and noise to a received signal that is required for each subcarrier for the modulation and coding scheme, and $\Delta_{BS}$ denotes an accumulated value of closed-loop power control commands.

In this case, $P_{previous}$ denotes transmission power per subcarrier for transmission of the current traffic burst, $SINR_{target}$ denotes a ratio of interference and noise to a received signal that is required for each subcarrier for a modulation and coding scheme that is used for transmission of the current traffic burst, $SINR_{previous}$ denotes a ratio of interference and noise to a received signal that is required for each subcarrier for a modulation and coding scheme for a recently transmitted traffic burst, and $\Delta_{BS}$ denotes an accumulated value of power adjusted values that are received from the base station 100 after the recent transmission of the traffic burst.

Then, the user terminal 300 performs uplink traffic burst transmission by performing scheduling in consideration of the uplink interference level of the base station 100. Further, since the user terminal 300 performs power control according to the power adjusted value that has been received through the downlink control channel, the user terminal 300 performs power control according to an uplink interference level.

FIG. 2 is a block diagram schematically illustrating an interference measuring unit of a neighbor base station according to an exemplary embodiment of the present invention.

As shown in FIG. 2, an interference measuring unit 210 of the neighbor base station 200 includes an interference detecting unit 211, an interference level measuring unit 213, and an interference level transmitting unit 215.

The interference detecting unit 211 detects interference levels between sectors that the user terminal 300 of the neighbor sector causes at the time of the uplink traffic burst transmission.

The interference level measuring unit 213 normalizes the uplink interference having been detected by the user terminal 300 with an uplink interference level according to a value of the detected interference.

The interference level transmitting unit 215 transmits the uplink interference level to the neighbor base stations 100 through the communication network.

FIG. 3 is a block diagram schematically illustrating an interference level controller of a user terminal according to an exemplary embodiment of the present invention.

As shown in FIG. 3, an interference level controller 310 of the user terminal 300 includes an interference level receiving unit 311, a neighbor sector selecting unit 313, a correction power generator 315, and a transmission power setting unit 317.

The interference level receiving unit 311 receives the uplink interference levels that are broadcasted from the base station 100, and transmits the received uplink interference levels to the neighbor sector selecting unit 313.

The neighbor sector selecting unit 313 selects an uplink interference level whose interference level is not preferable among the received uplink interference levels and transmits it to the correction power setting unit 315.

The correction power setting unit 315 sets a correction power offset according to the interference level of the received uplink interference level, and transmits the set correction power offset to the transmission power generator 317.

The transmission power setting unit 317 reflects the received correction power offset on the transmission power that is to be reported to the base station 100 so as to set the corrected transmission power, and reports it to the base station through the feedback channel.

According to the exemplary embodiment of the present invention, if the uplink interference level of the neighbor sector is broadcasted from the service base station, it is possible to reduce the transmission power and the wireless resource used by the base station for the corresponding signal, thereby improving the receiving function of the user terminal.

Further, the user terminal can immediately adjust the transmission power according to the uplink interference level of the neighbor sector and a change in a channel gain with the neighbor sector.

Furthermore, the base station can perform uplink scheduling in consideration of the transmission power offset set by each user terminal.

The exemplary embodiment of the present invention that has been described above may be implemented by not only a method and an apparatus but also a program capable of realizing a function corresponding to the structure according to the exemplary embodiment of the present invention and a recording medium having the program recorded therein. It can be understood by those skilled in the art that the implementation can be easily made from the above-described exemplary embodiment of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of performing uplink scheduling for a terminal at a first base station, the method comprising:
receiving information on uplink interference by the terminal from a second base station that neighbors the first base station;
transmitting the information on the uplink interference to the terminal;
receiving information from the terminal through the feedback channel on reported transmission power of a feedback channel obtained by subtracting, from the transmission power used by the terminal in the feedback channel, a correction power due to the uplink interference;
comparing the reported transmission power and received power of the feedback channel so as to estimate transmission loss; and
performing the uplink scheduling for the terminal by reflecting the transmission loss.

2. The method of claim 1, wherein the performing of the uplink scheduling includes transmitting a ratio of interference and noise to a signal (SINR) for a modulation coding scheme due to the uplink interference to the terminal such that the terminal determines traffic transmission power.

3. The method of claim 1, wherein the performing of the uplink scheduling includes transmitting a ratio of interference and noise to a signal (SINR) for a modulation coding scheme due to the uplink interference and the transmission loss to the terminal such that the terminal determines traffic transmission power.

4. The method of claim 1, wherein the transmitting of the information on the uplink interference includes periodically broadcasting the information on the uplink interference using a plurality of subcarriers.

5. The method of claim 4, wherein the broadcasting of the information on the uplink interference using the plurality of subcarriers includes determining the number of the plurality of subcarriers according to an amount of the information on the uplink interference, a processing gain for transmitting the information on the uplink interference, and the number of neighbor sectors neighboring the first base station.

6. A method of setting transmission power for a serving base station at a terminal, the method comprising:
- receiving uplink interference levels for a plurality of sectors neighboring the serving base station from the serving base station;
- selecting a neighbor sector that has an uplink interference level whose value is larger than a threshold value, among the uplink interference levels;
- setting a negative correction power offset according to the uplink interference level of the selected neighbor sector;
- setting correction transmission power by subtracting, from transmission power used in a feedback channel used to report the transmission power, the correction power offset; and
- transmitting the correction transmission power to the serving base station through the feedback channel.

7. The method of claim 6, further comprising:
- receiving uplink scheduling from the serving base station; and
- setting uplink traffic burst transmission power according to the uplink scheduling.

8. The method of claim 7, wherein the setting of the uplink traffic burst transmission power includes causing the terminal to determine the traffic transmission power according to an SNR by a modulation coding scheme according to the scheduling, uplink transmission loss occurring at the time of transmitting the feedback channel, interference and noise power per subcarrier, an accumulated value of correction power values received from the serving base station, and an accumulated value of recent power control commands for the feedback channel received from the serving base station.

9. The method of claim 7, wherein the setting of the uplink traffic burst transmission power includes causing the terminal to determine the traffic transmission power according to the transmission power used at the time of transmitting the traffic burst to the serving base station, the SINR by the modulation coding scheme according to the scheduling, and an accumulated value of power adjusted values received from the serving base station.

10. A method of setting transmission power for a serving base station at a terminal, the method comprising:
- receiving uplink interference levels measured in a plurality of sectors neighboring the serving base station from the serving base station;
- selecting a neighbor sector that has an uplink interference level whose value is smaller than a threshold value, among the uplink interference levels;
- setting a positive correction power offset according to the uplink interference level of the selected neighbor sector;
- setting correction transmission power by subtracting transmission power used by a feedback channel used to report the transmission power by the correction power offset; and
- transmitting the correction transmission power to the serving base station through the feedback channel.

* * * * *